United States Patent
Hirschek et al.

(10) Patent No.: US 6,688,839 B1
(45) Date of Patent: Feb. 10, 2004

(54) DEVICE FOR PROCESSING BOTTLES

(75) Inventors: Herwig Hirschek, Bobingen (DE); Gunter Höfer, Prittriching (DE)

(73) Assignee: Certus Maschinenbau GmbH, Friedberg (DE)

( * ) Notice: Subject to any disclaimer, the term of this patent is extended or adjusted under 35 U.S.C. 154(b) by 0 days.

(21) Appl. No.: 09/673,394

(22) PCT Filed: Apr. 23, 1999

(86) PCT No.: PCT/EP99/02754

§ 371 (c)(1), (2), (4) Date: Oct. 16, 2000

(87) PCT Pub. No.: WO99/55604

PCT Pub. Date: Nov. 4, 1999

(30) Foreign Application Priority Data

Apr. 23, 1998 (DE) ..................................... 298 07 325 U
Oct. 14, 1998 (DE) ..................................... 298 18 293 U

(51) Int. Cl.[7] .............................................. B65G 35/00
(52) U.S. Cl. ..................................... 414/799; 198/347.1
(58) Field of Search ........................... 198/465.1, 469.1, 198/473.1, 347.1, 347.3; 414/789.5, 791.6, 791.7, 792.9, 799, 927, 928, 929

(56) References Cited

U.S. PATENT DOCUMENTS

| | | | | |
|---|---|---|---|---|
| 2,535,880 | A | | 12/1950 | Tomkins ........................ 53/447 |
| 3,714,756 | A | | 2/1973 | MacInnes et al. ............. 53/48.4 |
| 4,251,979 | A | * | 2/1981 | Horigome et al. .............. 53/543 |
| 4,259,826 | A | * | 4/1981 | Campbell ..................... 53/543 |
| 4,277,932 | A | * | 7/1981 | Campbell ..................... 53/497 |
| 5,267,590 | A | * | 12/1993 | Pringle ................... 414/791.7 X |
| 6,196,788 | B1 | * | 3/2001 | Talbot et al. ......... 414/791.7 X |

FOREIGN PATENT DOCUMENTS

| | | |
|---|---|---|
| DE | 1228557 | 6/1967 |
| DE | 1461778 | 2/1969 |
| DE | 2402357 | 9/1974 |
| DE | 7623086 | 12/1976 |
| DE | 2845660 | 5/1980 |
| DE | 3142078 A1 | 9/1983 |
| DE | 3235223 A1 | 3/1984 |
| DE | 3339045 A1 | 5/1985 |
| DE | 3700506 A1 | 8/1987 |
| DE | 3623342 A1 | 1/1988 |
| DE | 3703926 A1 | 8/1988 |
| DE | 3926650 A1 | 2/1991 |
| DE | 3942269 A1 | 7/1991 |
| DE | 4204993 C1 | 2/1993 |
| DE | 4322008 A1 | 1/1995 |
| DE | 4329179 A1 | 3/1995 |
| DE | 29501098 | 4/1995 |
| DE | 4405227 A1 | 8/1995 |
| DE | 4409964 A1 | 9/1995 |
| DE | 19535907 A1 | 4/1997 |
| DE | 29700878 U1 | 4/1997 |
| DE | 19628563 | 1/1998 |
| DE | 29707324 U1 | 10/1998 |
| EP | 0242017 | 10/1987 |

(List continued on next page.)

OTHER PUBLICATIONS

Ling Systems, Nov. 8, 1993, Product Data: Pet Handling.

*Primary Examiner*—Janice L. Krizek
(74) *Attorney, Agent, or Firm*—McGlew and Tuttle, P.C.

(57) ABSTRACT

The invention relates to a device for processing bottles, especially empty plastic bottles. The processing device (1) comprises at least one collecting device (4) for receiving bottles (3) delivered to it and for loading several mobile intermediate supports (6) with said bottles, as well as at least one magazine (37) for the intermediate storage of full and/or empty intermediate supports (6).

20 Claims, 5 Drawing Sheets

FOREIGN PATENT DOCUMENTS

| | | |
|---|---|---|
| EP | 0291674 | 11/1988 |
| EP | 0312490 | 3/1989 |
| EP | 0 472 909 A1 | 3/1992 |
| EP | 0659664 A1 | 6/1995 |
| FR | 2593776 | 10/1987 |
| FR | 2607481 | 6/1988 |
| FR | 2697512 | 5/1994 |
| GB | 2 168 024 A  * | 6/1986 |
| WO | WO 88/07968 | 10/1988 |
| WO | WO 96/12657 | 5/1996 |
| WO | WO 97/11898 | 4/1997 |

* cited by examiner

DEVICE FOR PROCESSING BOTTLES

FIELD OF THE INVENTION

The present invention pertains to a device for handling bottles, especially empty plastic bottles.

BACKGROUND OF THE INVENTION

Collecting and palletizing units for empty glass bottles have been known from practice. They comprise a palletizing unit and an upstream collecting device, which is connected to a bottle conveyor. The collecting device is used to take over the bottles fed in in rows by the bottle conveyor and to form layers of bottles. The collection device comprises a piling table or a piling conveyor, on which the bottles are placed row by row by the bottle conveyor. The bottles then move, standing, along the piling table or conveyor without being guided and are pushed together into a layer of bottles at the end in the piling area. The palletizing unit can grasp them here with bottle grippers layer by layer and build them up into a bottle stack, the so-called pallet, on a palletizing tray, while inserts and cover layers are pushed in. This collecting and palletizing technique is suitable for heavy and stable bottles. By contrast, it cannot be used with sufficient reliability for lightweight plastic bottles, especially so-called PET bottles. These types of bottles are difficult to handle because of their low weight, the electrostatic charge and due to the high feed velocity of the bottle conveyor. In addition, the possibilities of intervening with and controlling this plant are limited.

SUMMARY AND OBJECTS OF THE INVENTION

The object of the present invention is to provide a better bottle handling device.

According to the invention, a device for handling bottles, especially empty plastic bottles is provided. The device has a handling system with at least one collecting device for taking over bottles fed to it and a plurality of said transportable intermediate carriers. The handling system loads a plurality of the transportable intermediate carriers with the bottles. The handling system also has at least one storage facility for the intermediate storage of filled and/or empty intermediate carriers.

The design of the bottle handling system according to the present invention with collecting device, transportable intermediate carriers and storage facility makes it possible to buffer the bottles between the individual handling areas. The capacity of the plant, its flexibility and also its reliability of operation are markedly increased as a result. The formation of a buffer within the plant offers the great advantage that it entails a relatively low cost. In particular, the hitherto common and very expensive pneumatic conveyors become dispensable as a result. These pneumatic conveyors were used as buffers between the bottle producer and the collecting device or the palletizing device and had to have a corresponding length. The cost, the design effort and the space requirements are substantially reduced in the internal storage facility within the plant. Moreover, the buffer function has been substantially improved and increased.

The present invention offers a large number of functional and design variants of the bottle handling system. This applies to the plant capacity, which can be increased, to the said storage possibilities and various internal and external carrier circulations. In particular, it is advantageous that the intermediate carrier can stop during the transfer operation, which ensures a high accuracy of deposition and positioning. The formation of layers on the intermediate carrier makes possible the correct commissioning of the bottles for the pallets and a high palletizing capacity.

The intermediate carriers according to the present invention preferably have a bottle guide. As a result, the bottles are in a secured position and can also be removed in the correct position for removal from the pallet and for repeated separation at a filling unit or the like. Due to the design of the intermediate carrier according to the present invention and also of the collecting device, the bottles cannot fall over any more and cannot cause any disturbances in operation. In particular, the device according to the present invention is able to also take up bottles at very high feed velocities, to transfer them row by row, to assign them to rows and to load the intermediate carrier correspondingly. The device according to the present invention has a very high performance capacity as a result.

It is particularly advantageous that the closing of the row of the bottle rows fed in at laterally spaced locations from one another is also carried out with a high degree of reliability. The row is closed during the transfer within the circulating means of the transfer unit by laterally adjustable row grippers. The bottles can then be ultimately arranged in the bottle layer ultimately formed on the intermediate carrier in a dense layer suitable for the final palletization.

The device according to the present invention may also be set and converted for different bottle formats with relatively little effort.

In the case of the embodiment of the bottle handling device according to the present invention, the proneness to error and breakdown is extensively minimized. This increases the reliability of operation of the entire plant. The question of capacity can be solved by the intermediate storage facility. This makes it possible to use, in particular, a central palletizing unit for the entire plant and a further reduction in the risk of breakdown. The storage facility equalizes the different throughput of the bottle producers and of the central palletizing unit or of another bottle handling means, e.g., a washing unit, a filling unit or the like and it can be used, on the other hand, as a buffer in case of breakdown or disturbance of individual components of the plant. Above all, the bottle producer is cut off from any disturbing effects from the area of the palletizing unit or conveyor system.

The bottle handling device according to the present invention can be expanded into a larger plant, in which the individual devices may overlap and complement one another. The number and the assignment of the individual components, especially of the collecting devices, the palletizing units or the like can also be adapted in a suitable manner.

The device according to the present invention requires relatively little effort in terms of design and control engineering despite high reliability. It also requires little space and can be expanded in the above-mentioned manner as desired. Existing plants may also be retrofitted with it. The device according to the present invention is not bound to certain materials or formats of bottles but can be used for any bottle. Furthermore, it does not require any specially trained operating personnel.

In the preferred embodiment, the intermediate carriers circulate within the bottle handling device and are used for the layer by layer transport of the empty bottles between the bottle producer and the palletizing unit or other handling means. In addition, the intermediate carriers may, however, also circulate in a larger circulation by acting themselves as a pallet component and reaching, together with the empty bottles, first the filling unit and from there optionally even the consumers via the commercial connections. From here, they can optionally also be returned into the bottle handling device. This form of intermediate carrier with a preferably permanent bottle circulation in the entire circuit facilitates the different bottle handling operations and simplifies the construction and the machinery at the bottle producer, bottler and in logistics.

Some particularly advantageous embodiments of the design of the intermediate carriers are described herein. The design with a folded bottom is especially simple and inexpensive. The design as a display carrier has the advantage that the intermediate carrier is optimally suitable for the external circulation and for the way up to the consumer. In case of a corresponding design, the display carrier may return as tare in the circulation. However, it may also be disposed of as a disposable packaging at a suitable point. An intermediate carrier with plate bottom offers particularly favorable possibilities for forming layers and the transfer of the bottles, and the kinematics of the collecting device can be simplified and improved. Moreover, such an intermediate carrier can also be unloaded analogously, and the same advantages are obtained.

The intermediate carriers according to the present invention may be designed as multiformat carriers for different types and sizes of bottles. However, they may also be adapted for a special type of bottle, at least as far as the design of the interior space is concerned. Different intermediate carriers or identical intermediate carriers can thus be correspondingly used in the bottle handling device. The intermediate carriers preferably have the same size among each other, but they may also vary in this respect.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
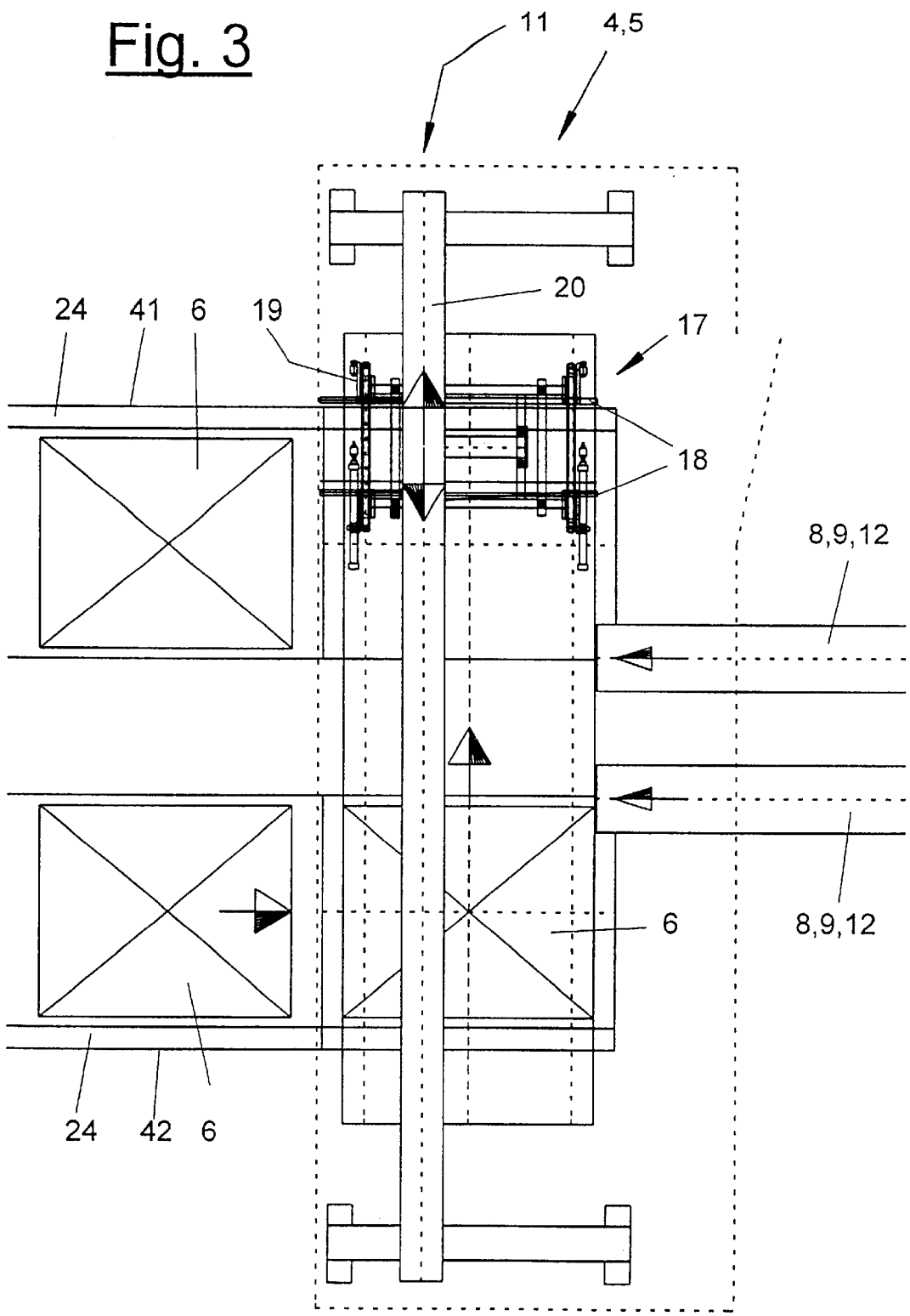
FIG. 3 is a top view of the variant of the collecting device according to FIG. 2.

Referring to the drawings in particular; FIG. 3 shows a schematic view of a bottle handling system 1 for bottles 3.

The bottles are preferably empty bottles 3 here, especially empty plastic bottles, especially PET bottles. The bottle handling system 1 has at least one collecting device 4 for the bottles 3, a plurality of transportable intermediate carriers 6 and at least one storage facility 37 for the intermediate carriers 6.

The bottle handling system 1 may be designed as a collecting and palletizing unit 2 and has at least one palletizing device 7. Instead of or in addition to the palletizing device 7, another means, e.g., a filling unit, a washing unit, a labeling station or the like may be present as well.

The collecting devices 4 have one or more transfer units 5, which load the movable or transportable intermediate carriers 6 with bottles 3. The intermediate carriers 6 connect the collecting device 4 with the storage facility 37, the palletizing device or devices 7 and the other means.

The collecting device 4 takes up the bottles 3 fed in from a bottle producer 36 in one or more single-track lines or rows 9 via one or more bottle conveyors 8, collects them in bottle layers 25 and loads the intermediate carriers 6. The palletizing device 7 stacks up the bottle layers 25 to multilayer pallets 35. One or more packaging means 33 along with discharge stations 34 may also join the palletizing device 7 on the output side.

Figure 1:
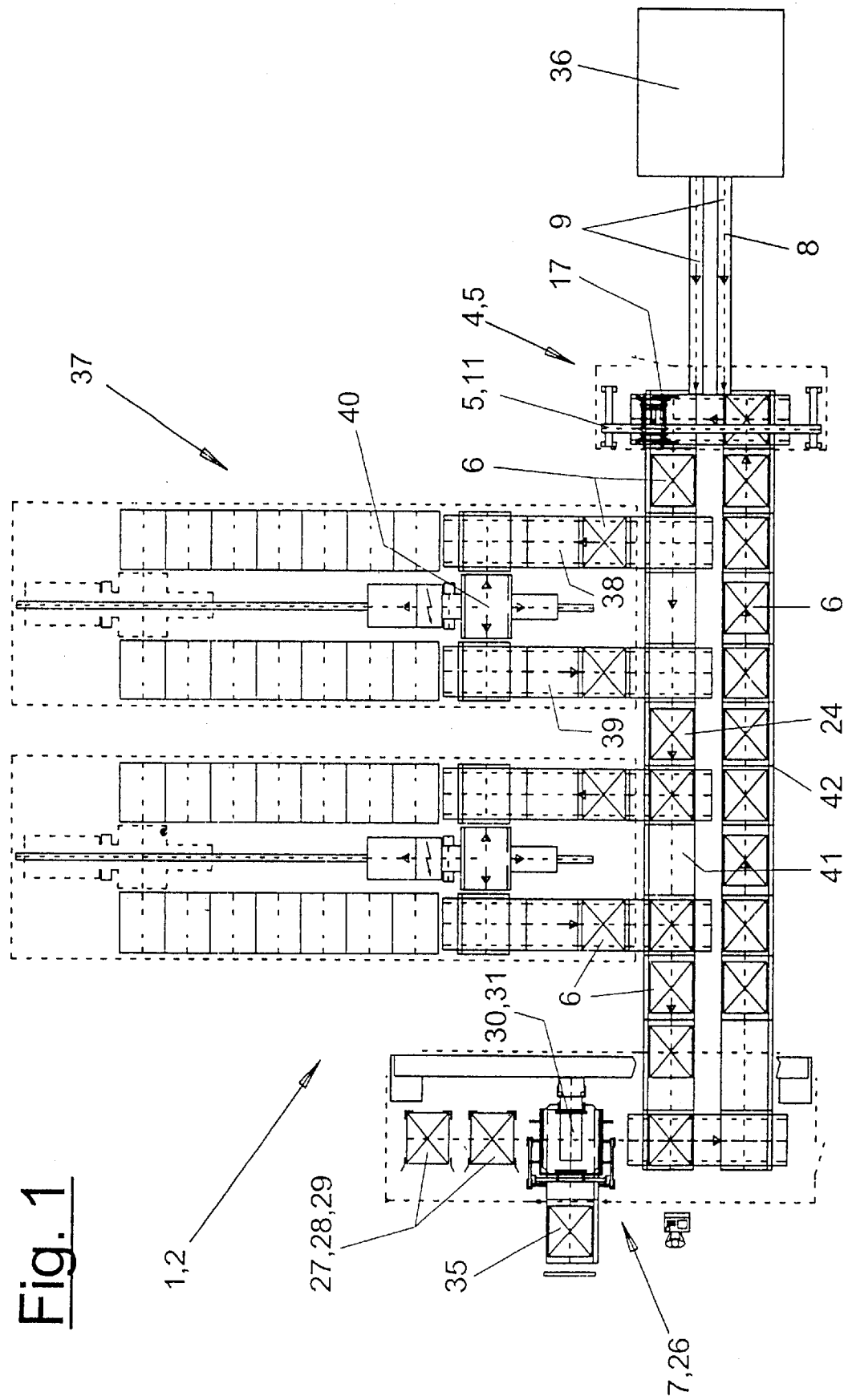
FIG. 1 is a schematic view of the plant showing a bottle handling device with a collecting and palletizing unit.

In the embodiment shown in FIG. 1, the bottle handling system 1 has, e.g., a collecting and palletizing unit 2 with a collecting device 4 and a palletizing device 7 each. As an alternative, a plurality of them may be arranged. The collecting device 4 is joined by two bottle conveyors 8. The bottle conveyors 8 may have any suitable design, e.g., they may be pneumatic conveyors. These have a slotted air flow duct, in which the bottles 3 are guided hanging by a bottle collar and are driven forward by an air flow shooting along in the duct. The bottles 3 move in the bottle conveyor 8 at a very high rate of, e.g., 10 bottles per second. To make it nevertheless possible to handle the bottles 3, each bottle conveyor 8 is gradually divided into a plurality of lines 9 via switches. For example, a plurality of such lines 9 open in parallel to one another at the collecting and palletizing devices.

The bottle producer 36 comprises, e.g., one or more blowing machines for plastic bottles. It may be arranged at a greater distance from the collecting and palletizing device 2, as a result of which the bottle conveyors 8 have a correspondingly great length and are preferably designed for this purpose as pneumatic conveyors in the above-mentioned manner.

In the embodiment shown in FIG. 1, the bottle producer 36 is located in the immediate vicinity of the collecting and palletizing device 2. The bottle conveyors 8 are preferably designed as short and straight conveyors here, which transfer the bottles 3 produced and continuously discharged by the bottle producer 36 in, e.g., two lines 8, 9 to the collecting device 4 with the transfer unit 5. Branching into more than two lines 9 may also be located in front of or at the transfer point.

The bottle conveyor or bottle conveyors 8 may have any desired, suitable design. They may be, e.g., short pneumatic conveyors. However, they may also have any other suitable design, e.g., they may be designed as sliding conveyors. The bottle conveyors 8 may have a suitable and preferably small piling section or buffer section for transferring the bottles 3 being fed continuously in lines one behind the other to the intermittently operating transfer unit 5. In a modified embodiment, the bottle producer 36 may also transfer its bottles 3 directly to the transfer unit 5.

FIG. 1 also shows that the collecting and palletizing device 2 has at least one intermediate storage facility 37, which is arranged between the collecting device 4 and the palletizing device 7. A conveying means 24, which preferably operates in circulation and has a feed branch 41 and a return branch 42, is provided for transporting the individual movable intermediate carriers 6. The conveying means 24 connects the collecting device 4 with the palletizing device 7. In addition, the intermediate storage facility 37 is also connected to the conveying means 24 and specifically preferably to its feed branch.

The intermediate storage facility 37 may have any desired, suitable device, e.g., it may be a high-shelf storage area. It may have one or more storage rows with correspondingly one or more high-bay storage and retrieval units. The individual storage areas have each an input 38 and an output 39 for the loaded, intermediate carriers 6, both of which are preferably connected to the feed branch 41. The high-bay storage and retrieval unit 40 then takes over the intermediate carriers 6 within the shelf from the input and stores them in the intended storage positions. Conversely, the intermediate carriers 6 are delivered via the output 39. They will then reach the palletizing device 7 directly via the feed branch 41.

The intermediate storage facility 37 for the loaded intermediate carriers 6 may have various functions. On the one hand, it may act as a buffer before a filling unit (not shown), especially if the bottle producer 36 and the filling unit have different capacities. It is meaningful, e.g., for cost reasons to use a small and low-capacity blowing machine 36, which operates around the clock. It may be advantageous now for the production of different bottle sizes to arrange a plurality of such small blowing machines 36 in parallel next to one another. It eliminates the need for the expensive and time-consuming retooling of a larger blowing machine to different types of bottles. The filling unit now has a correspondingly higher capacity and can fill bottles produced by a small blowing machine 36 in 8 hours. The storage facility 37 buffers the 16-hour operating time. The storage facility 37 may have a plurality of sections for storing the different types of bottles separated according to type. As a result, the filling means is uncoupled from the bottle production and can fill any desired type and amount of bottles 3 as needed. The different bottle producers 36 may operate continuously independently from this. A corresponding unpacking device (not shown), which removes the bottle layers 25 from the intermediate carriers 6 and separates the bottles 3 for being fed to the filling operation, is now arranged before the filling unit.

In another variant, the filling unit may be joined by the palletizing device 7 shown in FIG. 1. A second collecting device 4 with a transfer unit 5, which transfers the full bottles 3 fed in row by row from the filling unit to form bottle layers 25 on intermediate carriers 6 or transfer them directly to the palletizing device 7, is arranged behind the filling unit in this case.

In another variant, the intermediate storage facility 37 may be designed as a relatively small storage facility and act only as a buffer to ensure the production, e.g., as a so-called 5-minute buffer. The intermediate carriers 6 loaded on the collecting device 4 are then brought into the intermediate storage facility 37 only when needed, e.g., in the case of disturbances or bottlenecks. However, they are transported directly from the collecting device 4 to the palletizing device 7 during normal operation.

In another variant, a plurality of blowing machines or bottle producers 36 may be arranged in parallel next to one another, which produce different bottles. Intermediate storage according to types can be performed in the storage facility 37. This is advantageous, e.g., when only one palletizing device 7 is present, which first palletizes one type of bottle. The other types of bottles is/are now stored intermediately in the storage facility 37.

The bottle handling system 1 comprising the collecting device 4 and the storage facility 37 may also be arranged in front of a filling unit not shown independently from a bottle producer 36. The collecting device 4 may be designed in this case as a basic device for removing the empty bottle pallets fed in from the outside in any suitable manner. This device for removal from the pallets opens the pallet layers and delivers the empty bottles 3 to the intermediate carrier 6. The intermediate carriers 6 may be stored intermediately in the storage facility 37 before the filling of the bottles.

The unloaded and empty intermediate carriers 6 are again fed to the collecting device 4 with the transfer unit 5 by the palletizing device 7 on the return branch 42. The return branch 42 may have a piling section. However, a separate storage facility for buffering the intermediate carriers 6 may also join the return branch 42. This intermediate carrier storage facility is not shown for clarity's sake.

The feed branch 41 and the return branch 42 are preferably designed as straight conveying rows. They may be conveyor belts, roller conveyors or other suitable conveying means. The transfer of the intermediate carriers 6 takes place at the end points via corresponding cross belts. At the end-side cross belt, the palletizing device 7 takes over the bottle layers 25 from the intermediate carriers 6, so that the empty intermediate carriers 6 can then move back onto the return branch 42. At the front end, the cross belt is located in the area of the collecting device 4 and of the transfer unit 5. As a result, completely loaded intermediate carriers 6 can be delivered very rapidly to the feed branch 41 without interruption in time and without interruption of the cycle and new, empty intermediate carriers 6 can be brought into the loading position. As a result, the next, empty intermediate carrier 6 can also already be loaded at the collecting device 4 during the conveying and during the unloading at the palletizing device 7.

The bottles 3 preferably consist of plastic, especially polytetrafluoroethylene. These so-called PET bottles are thick-walled and have a low weight. On the neck of the bottle, they have a circular and laterally projecting collar, by which they can be grasped and guided, hanging, by the bottle conveyors 8. These bottles usually have a central indentation on their bottom and a plurality of upwardly extending notches at the surrounding edge, so that the base is formed by five contact points distributed around the central axis of the bottle. The diameter of the base is smaller than the external diameter of the bottles, so that the PET bottles have a certain lability. The bottles 3 may also become charged electrostatically and mutually repel one another as a result. Due to the low stability and the low weight, the bottles 3 are sensitive to mechanical shocks, air flows, etc., and tend to fall over.

Figure 2:
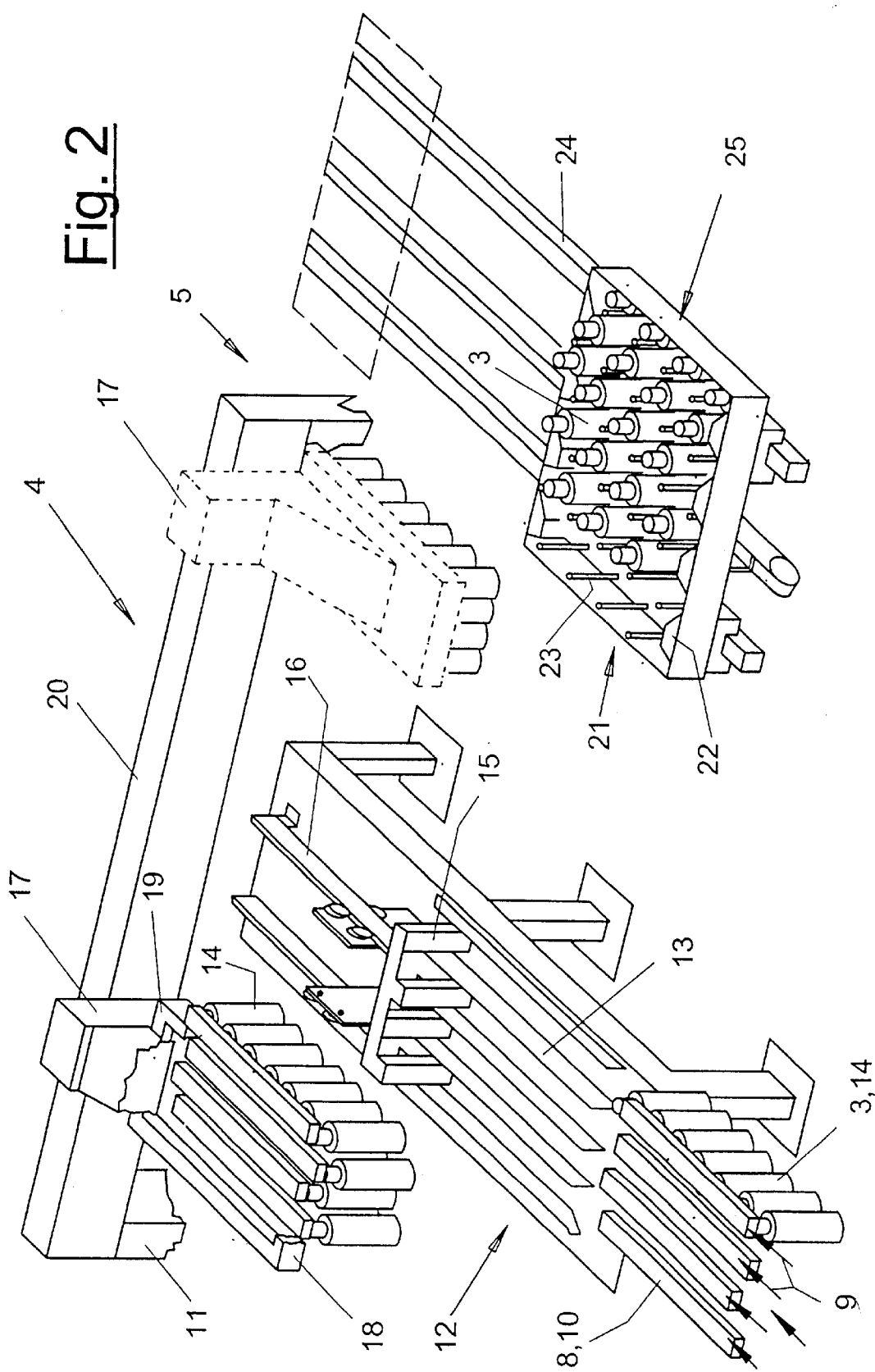
FIG. 2 is a perspective view of the collecting device of a collecting and palletizing unit.

FIG. 2 shows the opening or end area 10 of the bottle conveyor 8 at the collecting device 4. The bottles 3 arrive here line by line in rows one behind the other and are stopped by controllable closures not shown at the end of the conveyor 8. There is a piling or run-out section, in which, e.g., the conveying air is also blown off, in this end area. The bottles 3 present in the end area 10 are driven forward from behind by the bottles moving up behind them. FIG. 2 also shows how the bottles 3 hang by the collar in the conveying ducts.

FIG. 2 shows a specific embodiment of the collecting device 4. The collecting device 4 comprises at least one row support 12 and at least one transfer unit 5 and preferably a plurality of intermediate carriers 6. The collecting device 4 has a plurality of positive-locking bottle guides 13, 18, 21. As a result, the bottles 3 are taken over by the bottle conveyor 8 in rows, transferred onto the intermediate carrier 6, grouped to form a bottle layer 25, and then fed to the palletizing device 7, the bottles 34 being always guided preferably and essentially such that they cannot fall over and can move in a limited and controlled manner only. The intermediate carrier 6 is stopped during the transfer and loading operation.

The row support 12 joins the end area 10 of the bottle conveyor 8. The row support 12 has, e.g., a stationary piling table with a plurality of support aisles and railing-like bottle guides 13, which extend in a corresponding number and in extension of the end areas 10 of the bottle conveyor 8 and laterally guide the bottles 3 taken over from the bottle conveyor 8. The railings 13 have adjustable width and can be adapted to different bottle formats. In addition, they can be laterally displaced in order to adjust their number and arrangement in relation to the bottle conveyor 8. At the conveyor-side ends, the railings 13 may have oblique guide surfaces for the bottles 3 to slide on and be guided.

The bottles 3 may slide along on the piling table 12 in the upright position. As an alternative, the piling table 12 may also have a conveyor belt or the like, which moves in the direction of conveying of the bottles 3, instead of the stationary base. To take up the bottles 3, the closures of the end areas 10 are cyclically opened, so that the rows 14 of bottles being held there can be pushed onto the piling table 12. As soon as the predetermined length of the row has been reached, the closures of the end areas 10 close again, so that the next batch of bottles can pile up.

The row support 12 has at least one stop 15 each in the area of the bottle guides 13. In the simplest embodiment, the stops 15 may be arranged stationarily. They are now periodically offset axially from one row to the next, and the amount of the offset preferably equals half of the bottle diameter. As a result, the adjacent rows 14 of bottles are arranged offset in relation to one another such that gaps are closed and the tightest possible packing of bottles is formed in the bottle layer 25 to be formed later.

In addition, the stops 15 are axially movable in the embodiment shown and have a controlled drive 16 for this purpose, which is arranged, e.g., on an extension of the table or under the piling table 12. During the takeover of a new load of bottles, the stops 15 are positioned directly in front of the end area 10 of the bottle conveyor 8. As soon as the closures of the end area 10 open and push out the bottles 3, the stops 15 draw back in a controlled manner and offer an axial guiding for the bottles 3 taken up as a result. As a result, the bottles 3 cannot be knocked over during take-up. On the whole, the bottles 3 are guided all around on four sides in a positive-locking manner during the take-up, and the guiding in the rear is performed by the next bottle 3 following in the row.

After the takeover, the rows 14 of bottles are ready on the row support 12 for the transfer unit 5. The transfer unit 5 is preferably designed as a biaxial or multiaxial robot 11 with freely controllable and programmable axes and has a portal-like cross arm 20, which extends at right angles to the rows 14 of bottles and at which one or more gripping means 17 can move to and fro and lift over or transfer the rows 14 of bottles onto the intermediate carrier 6 kept ready on the feed branch 41.

The gripping means 17 is designed as a multiaxially movable gripping head. It has a plurality of row grippers 18, which grasp the rows 14 of bottles in the row support 12 in a suitable manner in the head area, hold them and release them on the intermediate carrier 6. The row grippers 18 comprise, e.g., long gripping channels with lateral gripping arms, which grasp the bottles under their necks and hold them in a positive-locking manner as a result.

The row grippers 18 may have one or more adjusting means 19. In the embodiment shown, the adjusting means 19 permits a lateral movement of the row grippers 18, as a result of which the rows 14 of bottles can move up closer to one another after the take-up. In the end area 10 and in the row support 12, the rows 14 of bottles are spaced somewhat more widely from one another because of adjustment to the format and for other design reasons. This lateral distance is greater than the distance desired in the bottle layer 25. Due to the lateral movement of the row grippers 18, the rows 14 of bottles can be guided in closely spaced locations from one another and they may even be brought into contact with one another corresponding to the desired packing density. The adjusting means 19 has a suitable drive along with a freely programmable control for this purpose.

The rows 14 of bottles and the intermediate carrier 6 have the same length in the exemplary embodiment shown. To fill the intermediate carrier 6, the rows 14 of bottles are placed next to one another, and the gripping means 17 moves repeatedly to and fro. The bottle layer 25 formed on the intermediate carrier 6 in this embodiment shown is as large as the bottom of the pallet.

In a variant of the embodiment shown, an intermediate carrier 6 may also have overlength and take up two or more bottle layers 25. As a result, two or more rows 14 of bottles must be correspondingly arranged one behind the other on the intermediate carrier 6. The adjusting means 19 may have additional mobility in the longitudinal direction of the row for this purpose and have, e.g., a telescoping means for this for extending the row grippers 18 not shown. In addition, the adjusting means 19 performs the lifting and lowering movements of the row grippers 18 necessary for the transfer. The row grippers 18 form the bottle guide during the transfer process.

A bottle guide 21 is also present on the intermediate carrier 6, which is preferably trough-shaped. It comprises, e.g., a frame, in which the bottles 3 are guided upright and all around in a positive-locking manner, similarly as in the row support 12. In the embodiment shown, the intermediate carrier 6 has for this purpose a carrier edge 22, which imitates the contour of the bottle and which also takes into account the offset of the rows by means of corresponding projections. A plurality of upright guide pins 23, which extend between four adjacent bottles 3 each, are arranged in the inner area of the intermediate carrier 6. The carrier edge 22 and the guide pins 23 may have slide-on bevels for easier introduction and insertion of the bottles 3. As an alternative, the bottle guides 21 may also be formed in any other manner, e.g., by shelf webs or the like.

The palletizing device 7 may also have different designs. The individual palletizing device 7 has one or more palletizing stations 26, on which the bottle layers 25 are stacked up on a pallet bottom one after another to form a complete pallet 35. The palletizing station 26 is arranged on the side next to the end position of the intermediate carrier 6 and the conveying means 24. One or more insert stacks 27, 28, 29 may join in a row on the other side. These stacks contain the pallet bottoms and the spacers and covers, which are needed for building up the bottle layers 25 and will hereinafter be called palletizing inserts. The spacers and covers are, e.g., cardboard or other suitable, flat materials, which are placed between the bottle layers 25.

The palletizing device 7 has at least one gripping means 30, 31 for transferring the bottle layers 25 from the intermediate carrier 6 onto the palletizing station and for taking in and inserting the palletizing inserts from the stacks 27, 28, 29. Separate gripping means 30, 31 are present in the preferred embodiment in order to increase the performance.

The palletizing device 7 is preferably likewise designed as a linear multiaxial robot 11, which has a cross arm 20 extending at right angles to the rows of bottles for displacing the gripping means 30, 31. The gripping means 30, 31 have suitable gripping heads, which can be at least raised and lowered and possibly have additional axes of movements.

The gripping means 31 is designed as a bottle gripper, which preferably grasps the entire bottle layer 25 and transfers it in one stroke onto the palletizing station 26. The gripping means 31 may have an additional axial adjustability in the form of a telescopic arrangement or the like for servicing multilayer and excessively long intermediate carriers 6.

The finished pallets 35 formed at the palletizing station 26 are fed via longitudinal and cross belts to a packaging device (not shown and wrapped, e.g., with a plastic film here and optionally strapped for stabilization. The packed pallets 35 are made ready for picking up in the adjoining discharge station and are brought from here, e.g., into an intermediate storage facility and farther to the filling unit (not shown.

Figure 4:
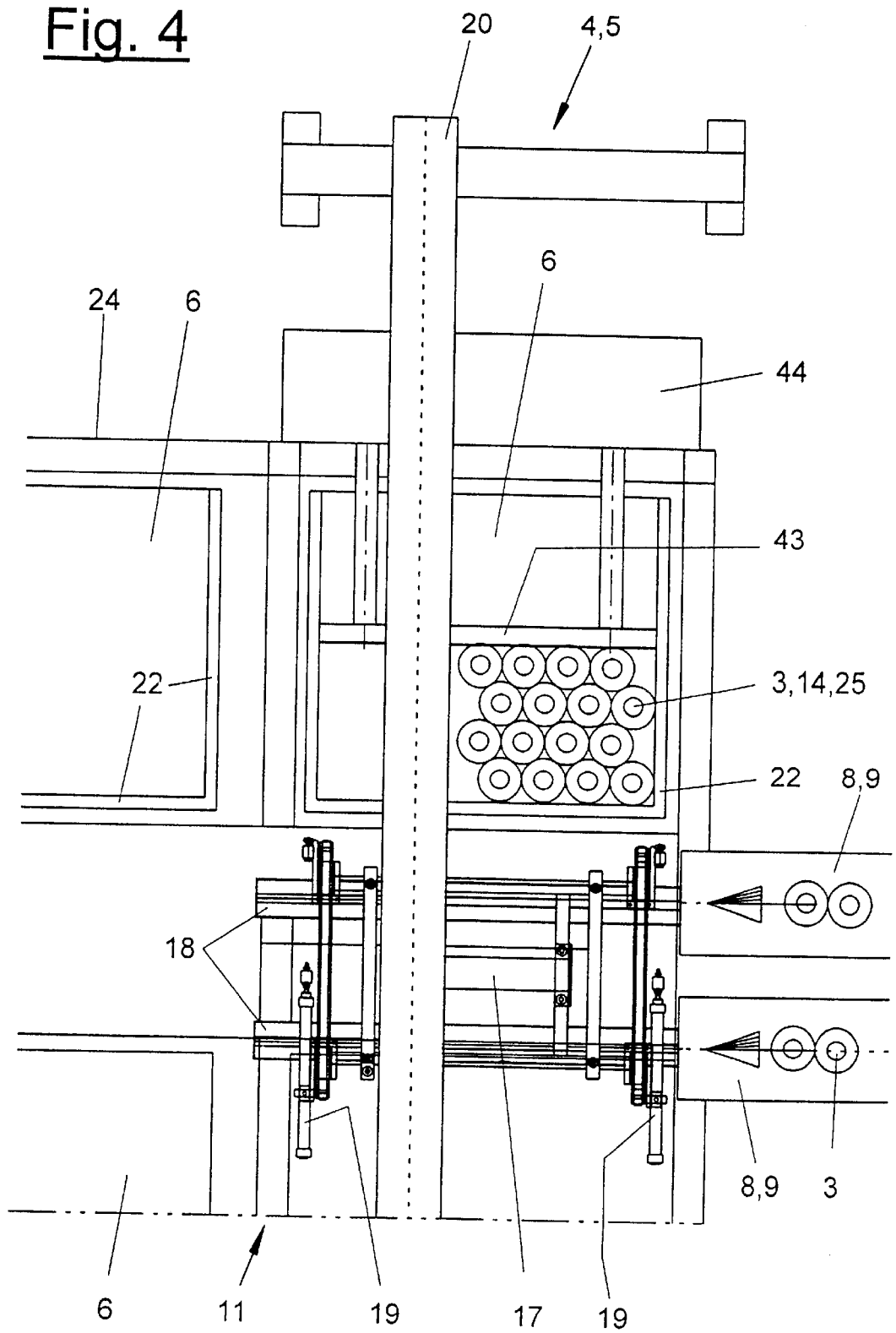
FIG. 4 is an enlarged top view of another variant of FIGS. 2 and 3.

FIGS. 3 and 4 show modifications of the collecting device 4 and of the transfer unit 5. In both cases, the transfer unit 5 can take over the bottles 3 with the gripping means 17 from the bottle conveyors 8 directly and without the intermediary of a piling table 12. The row grippers 18 are arranged at the same level as the bottle conveyors 8, so that the bottles 3 can be pushed over directly and hanging into the row grippers 18. The adjusting means 19 make possible the adjustment and accurate positioning of the row grippers 18 to the bottle conveyors 8. In particular, a plurality of bottle grippers 18 may be loaded simultaneously as well. In the embodiment shown, the gripping head 17 has two bottle grippers 18. However, the number may also be higher as desired. It may preferably correspond to the number of lines 9 or bottle conveyors 8. However, the number may also be different.

The intermediate carriers 6 in FIGS. 3 and 4 may correspond to the embodiment according to FIG. 2. However, FIG. 4 shows yet another variant for this. The intermediate carriers 6 comprise there trays open on one side with a flat bottom plate and three carrier edges 22 surrounding in a U-shaped pattern. Instead of the missing fourth carrier wall, a transversely movable pusher 43 with a suitable drive 44 is provided in the loading area. The pusher 43 forms, together with the existing carrier edges 22, the lateral bottle guide 21. The intermediate carrier 6 or its bottom plate has no guide pins 23 projecting upward in the middle area in this embodiment.

The pusher 43 is also used to position and push together the bottles 3 on the intermediate carrier 6. The rows 14 of bottles may be deposited by the transfer unit 5 at mutually laterally spaced locations from one another on the intermediate carrier 6. The pusher 43 is somewhat withdrawn for this purpose and offers the necessary free space. The pusher 43 then moves forward again and pushes the deposited rows 14 of bottles onto the rows of bottles already introduced and forms the necessary packing density of the bottle layers 25 in the process. Time is saved in this procedure for the transfer unit 5, which is advantageous for the preferred direct loading of the bottle grippers 18 at the bottle conveyors 8. In addition, the intermediate carriers 6 can pick up any bottle format as a result. The carrier edges 22 are also designed in this case as smooth walls without guiding profiles. The arrangement of the bottles is shown in FIG. 4 only partially and purely schematically.

The fourth carrier wall may be omitted for the further transport of the intermediate carriers 6. The bottle layer 25 is now guided on three sides via the remaining three carrier edges 22. As an alternative, the pusher 43 may also be designed as the fourth carrier wall and be correspondingly connected detachably to the drive 44. The carrier wall is unhinged during loading and it acts as a pusher plate. It is again connected to the intermediate carrier 6 in a suitable manner at the end of the loading.

Another variant of the bottle handling system 1 is also possible concerning the intermediate carrier circulation. In the embodiment shown in FIG. 1, the intermediate carriers 6 circulate within the bottle handling system 1 between the collecting device 4 and the palletizing device 7. They are loaded and unloaded permanently, and they may also be stored intermediately in the loaded or empty state. It is possible in the variant mentioned to also use the intermediate carriers 6 to form the pallet 35 and to allow them to leave the bottle handling system 1. In this case, the intermediate carriers 6 preferably have the bottle guides 21 shown in FIG. 2. In addition, the intermediate carriers 6 may also have suitable mutual guides in order to be able to be stacked one over another in a simple and self-centering manner to form the pallet. The palletizing device 7 with its robot 11 is also designed in a suitable manner for this purpose and it grasps the entire intermediate carrier 6 instead of the individual bottle layers 25 and transfers it to form the pallet. In this variant, the intermediate carriers 6 circulate in a larger circuit, which leads via the filling unit, the merchant and the consumer and back to the bottle handling system 1 via a reprocessing or cleaning plant. The circulating intermediate carrier 6 now takes up not only the empty bottles 3 loaded in the bottle handling system 1, but also the full bottles after the filling.

Figure 5:
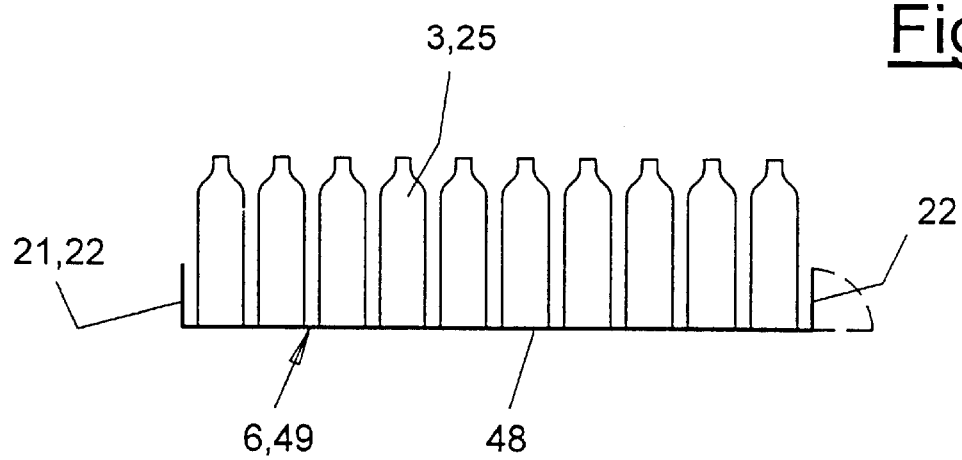
FIG. 5 is a side view of a variant of the intermediate carriers.
Figure 6:
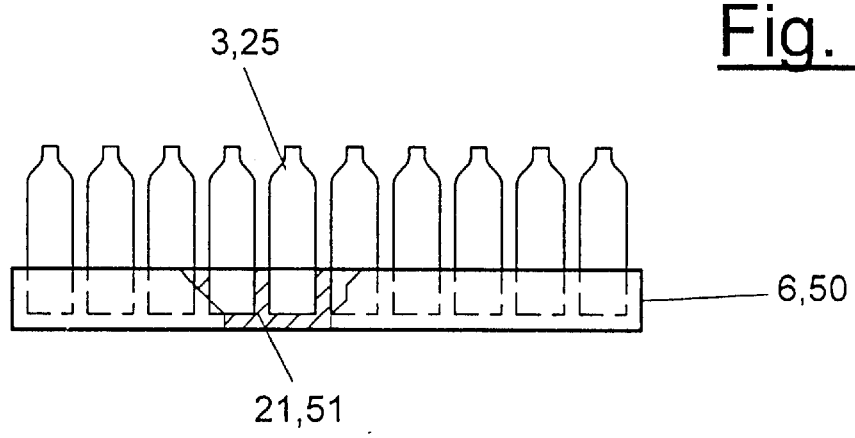
FIG. 6 is a side partially sectional view of another variant of the intermediate carriers.
Figure 7:
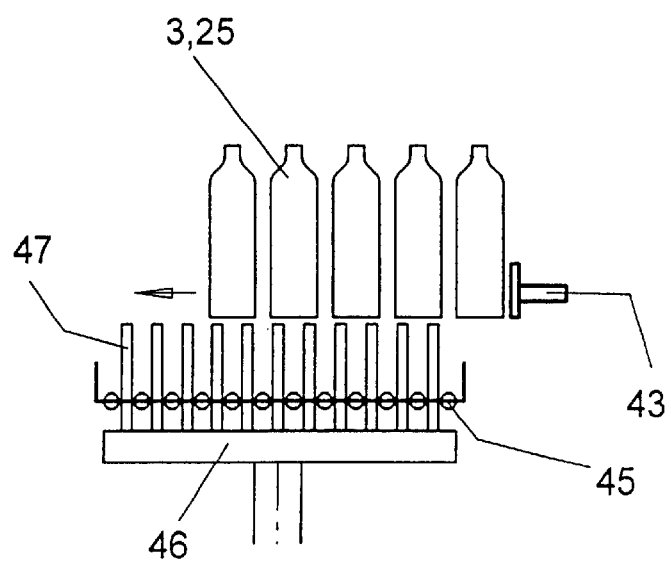
FIG. 7 is a side view of another variant of the intermediate carriers.

FIGS. 5, 6 and 7 show variants of the intermediate carrier 6.

FIG. 5 shows an especially simple embodiment, in which the intermediate carrier 6 is designed as a folded bottom 49. The folded bottom 49 consists of paperboard, cardboard, plastic or another suitable material and has a flat bottom plate 48 with four surrounding upright and closed edges 22. This folded bottom 49 can circulate within the bottle handling system 1. However, it may also be used to palletize the bottle layers 25 and leave the bottle handling system 1. Four new folded bottoms are correspondingly provided at the collecting device. One or more edges 22 can be torn off and folded over for removal from the pallets or for unloading the folded bottom, so that the bottle layer 25 can be pushed off with a pusher completely during the removal from the pallet.

FIG. 6 shows another variant of the intermediate carrier 6, which is designed as a so-called display carrier 50 here. The display carrier 50 has a bottle guide 21 for every individual bottle 3, which is designed, e.g., as an integrated guide trough 51. The display carrier 50 consists for this of, e.g., a blown, foamed molded plate or a molded plate made preferably of plastic in another manner. The display carrier 50 is likewise intended for external circulation and for use in retail and optionally also at the final consumer. It is particularly suitable for sale in discount stores in which the bottles 3 are offered for sale on the pallet. The display carrier 50 may also have a multipart design.

In an additional variant, FIG. 7 shows an intermediate carrier 6, which has a plate bottom 45. Correspondingly shaped opposing plates 47, which are moved up and down by a lifting means 46 arranged preferably stationarily at the collecting device 4, extend into the intermediate spaces between the plates. To load the intermediate carrier 6, the bottles 3 are first arranged in one or more parallel rows or optionally also in a complete bottle layer 25 at a correspondingly designed collecting device 4 and are then pushed off onto the raised opposite plates 47 by a pusher 43 or another, suitable actuating means. The size of the plates is selected to be so small compared with the size of the bottle that pushing off is possible. The pushing off may take place at right angles to or along the direction of the plates. After forming and positioning the finished bottle layer 25 or at least a subgroup, the loaded opposing plates 47 are lowered from the elevated take-over position shown in FIG. 7, and they exit the plate bottom 45 in the downward direction. The bottles 3 are now deposited on the plate bottom 45. The loaded intermediate carrier 6 can then be removed. This form of plate carrier makes possible another, simpler design of the collecting device 4 and of the transfer unit 5, the lifting and lowering movements of the bottle grippers are eliminated and are replaced with pure push-off movements. The layers can be formed from the bottles 3 fed in in individual rows by means of a rolling table or in any other desired, suitable manner. It is also possible here, in particular, to first position the bottles 3 at certain mutually laterally spaced locations from one another in groups to avoid the problems of adhesion and to collect them while forming layers. The bottles are then pushed together and brought into contact with one another only during the pushing off onto the intermediate carrier 6 or the opposing plates 47. Due to this time delay, the problems linked with adhesion and electrostatic charge will have often disappeared by the time the bottles 3 first come into contact with one another. This technique may also be used in conjunction with the other intermediate carriers 6 shown if the corresponding technical adaptation is made.

Various modifications of the embodiment shown and described are possible. The bottle conveyor 8 may have any desired, suitable design. Instead of a pneumatic conveyor with the bottles 3 being conveyed in the hanging position, an upright conveyor with rollers, a conveyor belt or other suitable conveying mechanisms may be provided as well. Furthermore, the number of rows 14 of bottles in the area of the bottle conveyor 8 and of the row supports 12 or of the transfer units 5 may vary. The number of rows also does not need to be always equal between the said components. Corresponding statements may also be made concerning the gripping means 31 for transferring the bottle layers 25 at the palletizing station 26. In one variant, the gripping means 31 can grasp and transfer only part of the bottle layer 25. In the other variant with excessively long intermediate carriers 6, it is possible to grasp a plurality of bottle layers 25 all at once. The bottle layer 25 is as large as the area of the pallet bottom in the embodiment described. This size is a matter of definition and can be modified. Different pallet sizes and/or bottle formats are sometimes also processed at a collecting and palletizing unit 2, so that the intermediate carrier 6 is filled only partly. The design of the technical components of the collecting and palletizing units 2, especially of the row support 12, the transfer unit 5, the palletizing device 7, the intermediate carrier 6, etc., is also variable. In particular, the gripping means for grasping the rows 14 of bottles may have any suitable design. The intermediate carrier 6 may be plate-like or have any other suitable shape as a container or carrier for the bottle layers.

While specific embodiments of the invention have been shown and described in detail to illustrate the application of the principles of the invention, it will be understood that the invention may be embodied otherwise without departing from such principles.

What is claimed is:

1. A system for handling bottles such as empty plastic bottles, the system comprising:
   a bottle source for feeding bottles;
   a plurality of transportable intermediate carriers;
   a collecting device for taking over bottles fed from said bottle source and for loading the plurality of transportable intermediate carriers with the bottles;
   a conveyor with a loading location adjacent to said collecting device, said conveyor for moving said intermediate carriers;
   a bottle treatment station for receiving bottles and treating received bottles; and
   a storage facility for the intermediate storage of filled and/or empty intermediate carriers, said storage facility having an input device and an output device, said conveyor extending from said loading location to a location adjacent to said input device and to a location adjacent to said output device and to a location adjacent to said bottle treatment station, said input device for receiving intermediate carriers from said conveyor into said storage facility, said output device for discharging intermediate carriers from said storage facility onto said conveyor.

2. A system in accordance with claim 1, wherein said conveyor runs in a direction from said loading location past said location adjacent to said input device, past said location adjacent to said output device and to said location adjacent to said bottle treatment station and may be operated in reverse from said location adjacent to said bottle treatment station past said location adjacent to said output device past said location adjacent to said input device and to said loading location.

3. A system in accordance with claim 1, wherein said collecting device and said intermediate carriers include bottle guides.

4. A system in accordance with claim 1, wherein said bottle treatment station comprises a palletizing device or a filling unit wherein said storage facility is arranged at a location along said conveyor between said collecting device and said palletizing device or filling unit.

5. A system in accordance with claim 1, wherein said intermediate carriers are designed as display carriers.

6. A system in accordance with claim 1, wherein said intermediate carriers have a plate bottom, which cooperates with a stationary lifting device with opposing plates.

7. A system in accordance with claim 1, wherein said intermediate carrier receives rows of bottles to form a layer of bottles.

8. A system in accordance with claim 1, wherein said collecting device has a transfer unit with at least one gripping device with a plurality of laterally adjustable row grippers.

9. A system in accordance with claim 1, wherein said collecting device has a pusher for pushing the bottles on said intermediate carrier.

10. A system in accordance with claim 1, wherein said a bottle treatment station is one of a palletizing device, a bottle filling device, a bottle labeling device and a bottle washing device.

11. A system in accordance with claim 1, wherein said conveyor circulates in a direction from said loading location past said location adjacent to said input device, past said location adjacent to said output device and to said location adjacent to said bottle treatment station and then back to said loading location.

12. A system in accordance with claim 11, wherein said conveyor moves said intermediate carriers in a closed circuit within a plant or in an open circuit with external transport outside the plant.

13. A system in accordance with claim 1, wherein said bottle source comprises a bottle producer unit or a bottle conveyor, said collecting device being arranged directly at said bottle producer unit or a bottle conveyor and transferring bottles fed to said collecting device in rows onto said intermediate carriers to form at least one layer of bottles in rows on each intermediate carrier.

14. A system in accordance with claim 13, wherein said bottle producer unit is a blowing machine.

15. A system in accordance with claim 1, wherein said intermediate carriers are trays with at least one upright edge.

16. A system in accordance with claim 15, wherein said at least one upright edge is part of a folded bottom.

17. A system for handling bottles including empty plastic bottles, the system comprising:

a bottle processing unit;

a bottle source;

a plurality of transportable intermediate carriers;

a collecting device for collecting a plurality of bottles fed from said bottle source and for loading the plurality of bottles onto said transportable intermediate carriers;

a storage facility for the intermediate storage of loaded and/or empty intermediate carriers, said storage unit including a storage input portion and a storage output portion; and a conveyor for moving one or more of said intermediate carriers between said collecting device, said storage facility and said bottle processing unit, said conveyor extending from said collecting device to said processing unit and extending past a location adjacent to said storage input portion and extending past a location adjacent to said storage output portion.

18. A system in accordance with claim 17, wherein said collecting device and said intermediate carriers include bottle guides.

19. A system in accordance with claim 17, wherein said bottle source comprises a bottle producer blowing machine or a bottle conveyor, said collecting device being arranged directly at said bottle producer blowing machine or bottle conveyor and transferring bottles fed to said collecting device in rows onto said intermediate carriers while forming bottle layers.

20. A system in accordance with claim 17, wherein said conveyor moves said intermediate carriers in a closed circuit within a plant or in an open circuit with external transport outside the plant.

* * * * *